United States Patent
Aben et al.

(10) Patent No.: US 8,719,209 B2
(45) Date of Patent: May 6, 2014

(54) DATA ENRICHMENT APPARATUS AND METHOD OF DETERMINING TEMPORAL ACCESS INFORMATION

(75) Inventors: Sjoerd Aben, Alkmaar (NL); Erik Thomassen, Amsterdam (NL); Teun De Haas, Utrecht (NL)

(73) Assignee: TomTom International B.V., Amsterdam (NL)

( * ) Notice: Subject to any disclaimer, the term of this patent is extended or adjusted under 35 U.S.C. 154(b) by 302 days.

(21) Appl. No.: 13/120,431

(22) PCT Filed: Oct. 9, 2008

(86) PCT No.: PCT/EP2008/063559
§ 371 (c)(1),
(2), (4) Date: May 4, 2011

(87) PCT Pub. No.: WO2010/040410
PCT Pub. Date: Apr. 15, 2010

(65) Prior Publication Data
US 2011/0238609 A1    Sep. 29, 2011

(51) Int. Cl.
*G06F 19/00* (2011.01)
*G06T 1/00* (2006.01)

(52) U.S. Cl.
USPC .......................................................... 706/50

(58) Field of Classification Search
USPC ................................ 706/50, 52, 55
See application file for complete search history.

(56) References Cited

U.S. PATENT DOCUMENTS

| | | |
|---|---|---|
| 8,224,766 B2 * | 7/2012 | Skibiski et al. ............... 706/55 |
| 2003/0146854 A1 | 8/2003 | Jones |
| 2004/0133345 A1 | 7/2004 | Asahara |
| 2004/0152471 A1 | 8/2004 | MacDonald et al. |
| 2005/0165543 A1 | 7/2005 | Yokota |
| 2006/0129636 A1 | 6/2006 | Matsuura et al. |
| 2006/0149459 A1 | 7/2006 | Matsuura et al. |
| 2006/0184541 A1 | 8/2006 | Kim |
| 2006/0286987 A1 | 12/2006 | Ryu et al. |
| 2007/0005242 A1 | 1/2007 | Kato et al. |
| 2007/0198184 A1 | 8/2007 | Yoshioka et al. |
| 2009/0312946 A1 | 12/2009 | Yoshioka et al. |

FOREIGN PATENT DOCUMENTS

| | | |
|---|---|---|
| EP | 1655677 A1 | 5/2006 |
| EP | 1669719 A | 6/2006 |
| JP | 2007017175 A | 1/2007 |
| WO | 2008041480 A1 | 4/2008 |
| WO | 2008050711 A1 | 5/2008 |

OTHER PUBLICATIONS

International Search Report issued Feb. 4, 2010 for International Application No. PCT/EP2008/064364.

(Continued)

*Primary Examiner* — Jeffrey A Gaffin
*Assistant Examiner* — Ola Olude Afolabi

(57) ABSTRACT

A data enrichment processing apparatus (100) comprises a processing resource (154) arranged to access, when in use, location data (300) having temporal data associated therewith, and to group a part of the location data according to a predetermined criterion. The processing resource (154) is arranged to support an analysis module (268) capable of inferring temporal access information from the part of the location data grouped, the temporal access information being indicative of ability to access physically a point of interest associated with the part of the location data grouped.

22 Claims, 9 Drawing Sheets

(56) References Cited

OTHER PUBLICATIONS

Tezuka, T. et al., "Temporal and Spatial Attribute Extraction from Web Documents and Time-Specific Regional Web Search System," Web and Wireless Geographical Information Systems, 4th International Workshop, pp. 14-25, 2004.

PCT/EP2008/063559 ISA (international search report) dated Feb. 4, 2010.

* cited by examiner

DATA ENRICHMENT APPARATUS AND METHOD OF DETERMINING TEMPORAL ACCESS INFORMATION

This application is the National Stage of International Application No. PCT/EP2008/063559, filed Oct. 9, 2008 and designating the United States. The entire contents of this application is incorporated herein by reference.

FIELD OF THE INVENTION

The present invention relates to a data enrichment apparatus of the type that, for example, is capable of providing temporal access information to complement point of interest information. The present invention also relates to a method of determining temporal access information, the method being of the type that, for example, provides temporal access information in relation to point of interest information.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but can be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route recalculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 930 Traffic model manufactured and supplied by TomTom International B.V., provide a reliable means for enabling users to navigate from one position to another. Such devices are of great utility when the user is not familiar with the route to the destination to which they are navigating.

As indicated above, one or more POIs can be selected by a user of the PND in respect of a journey to be embarked upon or during a journey. To select a POI during a journey, a user typically negotiates a menu structure of a user interface of the PND in order to select a category of POI desired, for example a supermarket or a petrol station. The application software of the PND then identifies, using locally stored data, a number of POIs of the type selected by the user and presents the identified POIs to the user via the user interface. To assist the user, the application software typically orders the POIs identified by distance from a current location of the PND and indicates an associated distance value adjacent the POI listed. The user can then select one of the POIs identified by the user interface and the application software. In response to selection of one of the POIs, the application software either sets the POI selected as a waypoint or an ultimate destination and the PND then calculates a route either via the POI selected or to the POI selected, as appropriate. Of course, if the user is already en-route and the PND is already providing navigation assistance, the PND integrates the POI chosen into an existing route calculated, for example by recalculating the existing route to take into account the selection made by the user.

On the whole, this technique works quite well and provides satisfactory results for the user. However, a disadvantage of this technique is that a user, wishing to navigate to or via a given point of interest, can arrive at the given point of interest at a time that is incompatible with operating hours of the given point of interest. For example, it is conceivable that a user being navigated to a museum, the museum being a selected point of interest, can arrive after the museum has closed or on a day when the museum is closed. Hence, it can be seen that a temporal mismatch can occur between an arrival time and the operating hours of the point of interest. In order to support navigation functionality that would use temporal information concerning a POI to avoid a user navigating to the POI at an incorrect or inappropriate time, it is necessary to build a database of POI information comprising the temporal information mentioned above. In this respect, the temporal information can be quite complex, for example hours of business or operation of a POI can vary with time in a number of different ways, for example: daily, weekly, monthly and/or seasonally. Indeed, some POIs can be closed during certain seasons, for example certain restaurants and theme parks or attractions, such as a water park that is closed during winter.

The required temporal information can be supplied by entities responsible for the POI, for example business owners or administrative staff. In many cases, there is an incentive for parties associated with the POI to supply temporal information associated with the POI in order to better promote the POI and ensure visitors arrive at the POI at correct times and so are not disappointed. For example, a visitor may be disappointed if arrival at the POI is at an incorrect or inappropriate time. In this respect, a visitor to a restaurant, for example, may be declined service if the visitor arrives too late for the visitor to be accommodated. Similarly, a visitor that arrives at the museum mentioned above when it is closed or close to closing time of the museum will most probably be disappointed by the limited or lack of availability of the museum.

Although, as mentioned above, an incentive exists for temporal information of the POI to be provided to a compiler of a POI database, there exists a large number of entities that are either unaware of the ability to supply temporal information to compilers of POI databases or do not perceive the provision of the temporal information to be of value.

Other techniques are, of course, at the disposal of the compilers of the POI database in order to obtain the temporal information required to enrich existing and new POI information. In this respect, the compiler of the POI database can resort to Internet search engines, directories or direct contact with the POI. However, such an approach is very labour intensive. Additionally, some POIs are more popular than others and it is desirable to ensure as early as possible that temporal information relating to such popular POIs is available for use by navigation devices. Use of manual searching and direct communication with POIs is subjective in nature and so does not necessarily target the POIs that are truly popular. To this end, manual selection of POIs is dependent upon the person or people identifying the POI as popular being correct in their assessment of popularity. Additionally, it is not always clear as to which POIs are popular, in particular, with users of navigation devices and a manual search does not easily identify such POIs.

SUMMARY OF THE INVENTION

According to a first aspect of the present invention, there is provided a data enrichment apparatus comprising: a processing resource arranged to access, when in use, location data having temporal data associated therewith, and to group a part of the location data according to a predetermined criterion; wherein the processing resource is arranged to support an analysis module capable of inferring temporal access information from the part of the location data grouped, the temporal access information being indicative of ability to access physically a point of interest associated with the part of the location data grouped.

The temporal access information may characterise access to the point of interest. The temporal access information indicative of the ability to access physically the point of interest may be the temporal access information being indicative of when access to the point of interest is permitted or not permitted.

The apparatus may further comprise location trip data that may comprise the location data and the temporal data associated therewith.

The temporal data may comprise a time associated with a navigation apparatus being at a location.

The predetermined criterion may be spatial clustering. The spatial clustering may within a predetermined notional boundary. The predetermined notional boundary may be a radius.

The predetermined criterion may be a predetermined proximity to the point of interest.

The analysis module may be arranged to analyse the temporal data associated with the part of the location data grouped and may build a temporal access profile associated with the part of the location data grouped.

The analysis module may be arranged to analyse the temporal data associated with the part of the location data grouped and may identify boundary temporal data from the temporal data associated with the part of the location data grouped.

The boundary temporal data may be used to determine the temporal access information associated with the point of interest.

The analysis module may be arranged to match a closest predetermined temporal access profile to the temporal access information inferred. The closest predetermined temporal access profile may be a predetermined characterisation of physical accessibility to the point of interest with respect to time. The analysis module may be capable of recording the match by a variation with respect to the closest predetermined temporal access profile.

The temporal access information may correspond to opening times of the point of interest.

The point of interest may be unidentified. The analysis module may be arranged to access a point of interest database comprising identities of points of interest and respective location data, and may identify the unidentified point of interest using the point of interest database.

The point of interest database may be formed by contribution of point of interest information from users of navigation apparatus.

The predetermined criterion may change in strength of a radio-frequency signal being received. The change in strength may be relative to a predetermined threshold value or loss of reception of the radio-frequency signal.

The radio-frequency signal may relate to a navigation system or a wireless bidirectional communications system.

The analysis module may be arranged to group the part of the locations data also according to another predetermined criterion, the another predetermined criterion being the predetermined criterion as set forth above.

The analysis module may be arranged to infer in respect of the part of the location information grouped a same temporal access information as another temporal access information associated with a neighbouring point of interest relative to the point of interest.

According to a second aspect of the present invention, there is provided a server apparatus comprising the data enrichment apparatus as set forth above in relation to the first aspect of the invention.

According to a third aspect of the present invention, there is provided a location data processing system comprising: the data enrichment apparatus as set forth above in relation to the first aspect of the invention; a database of the location data having the temporal data associated therewith; and a plurality of navigation apparatus arranged to contribute to the database of the location data.

According to a fourth aspect of the present invention, there is provided a method of determining temporal access information associated with a point of interest, the method comprising: accessing location data having temporal data associated therewith; grouping a part of the location data according to a predetermined criterion; and inferring temporal access information from the part of the location data grouped, the temporal access information being indicative of ability to access physically a point of interest associated with the part of the location data grouped.

According to a fifth aspect of the present invention, there is provided a computer program element comprising computer program code means to make a computer execute the method as set forth above in relation to the fourth aspect of the invention.

The computer program element may be embodied on a computer readable medium.

Advantages of these embodiments are set out hereafter, and further details and features of each of these embodiments are defined in the accompanying dependent claims and elsewhere in the following detailed description.

It is thus possible to provide a data enrichment apparatus and a method of determining temporal access information capable of capturing temporal information concerning a point of interest. The apparatus and method are also capable of learning temporal information from information recorded concerning a location visited by navigation apparatus and temporal information relating thereto. Signal strength information permits determination of the temporal information with increased accuracy. The apparatus and method thus enable richer point of interest content to be generated, which in turn can be used by users in order to obtain an improved user experience in relation to the navigation apparatus, as well as the possibility of saving the user time and inconvenience.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
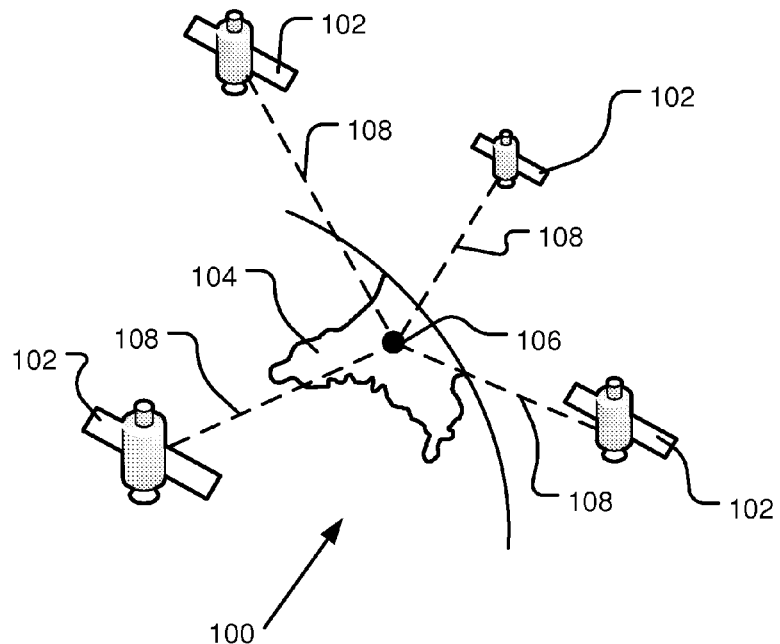
FIG. 1 is a schematic illustration of an exemplary part of a Global Positioning System (GPS) usable by a navigation apparatus.

Throughout the following description identical reference numerals will be used to identify like parts.

One or more embodiments of the present invention will now be described with particular reference to a PND. It should be remembered, however, that the teachings herein are not limited to PNDs but are instead universally applicable to any type of processing device that is configured to execute navigation software in a portable and/or mobile manner so as to provide route planning and navigation functionality. It follows therefore that in the context of the embodiments set forth herein, a navigation apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
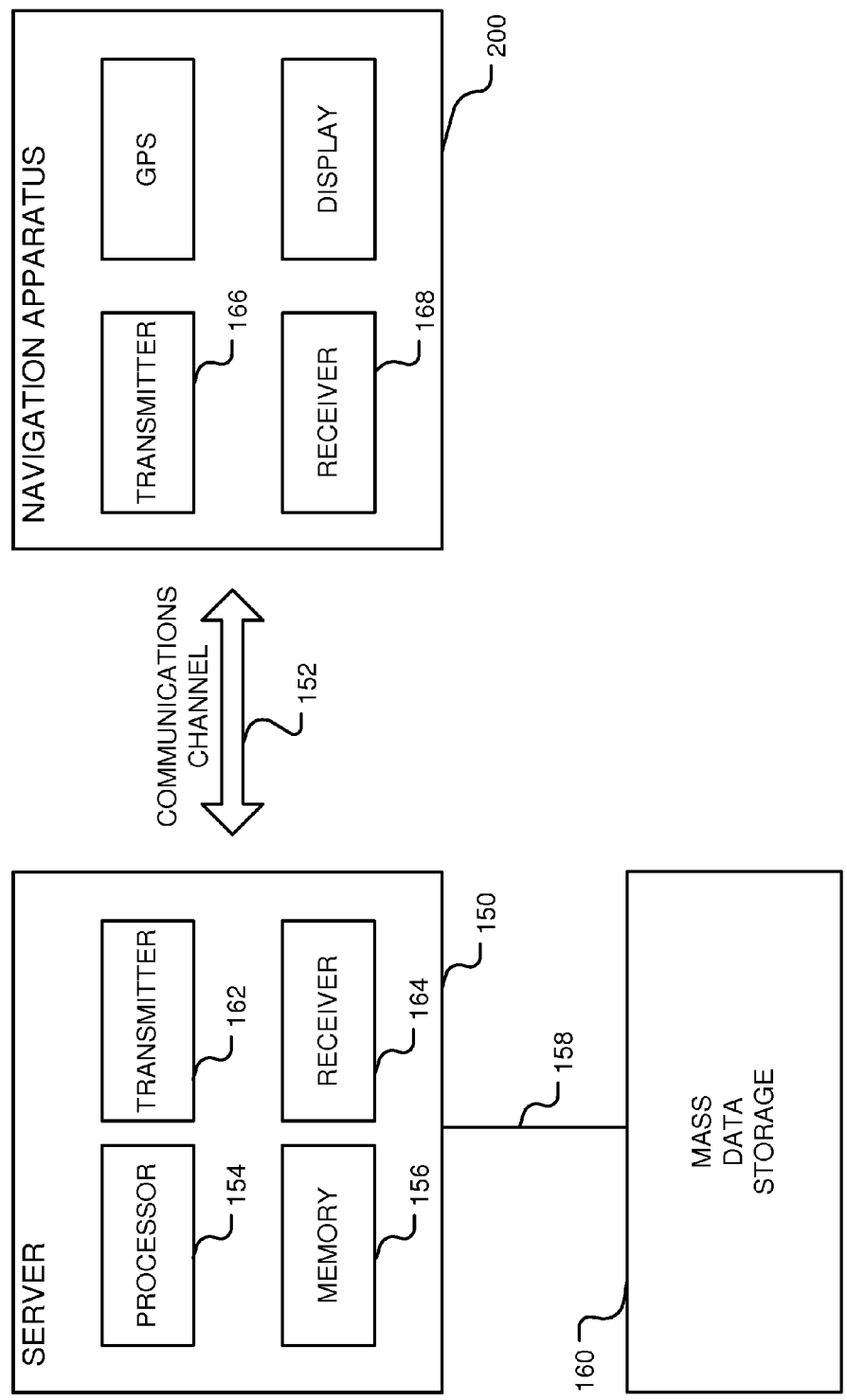
FIG. 2 is a schematic diagram of a communications system for communication between a navigation apparatus and a server apparatus.

In FIG. 2, a navigation system comprises a navigation apparatus 200 capable of communicating, if desired in an embodiment, with a server 150 via a communications channel 152 supported by a communications network that can be implemented by any of a number of different arrangements. The communication channel 152 generically represents the propagating medium or path that connects the navigation apparatus 200 and the server 150. The server 150 and the navigation apparatus 200 can communicate when a connection via the communications channel 152 is established between the server 150 and the navigation apparatus 200 (noting that such a connection can be a data connection via mobile device, a direct connection via personal computer via the internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications signals, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 is supported by telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 152. These signals may be modulated, encrypted and/or compressed signals as may be desirable for the communication technology.

In this example, the navigation apparatus 200 comprising or coupled to the GPS receiver device 106, is capable of establishing a data session, if required, with network hardware of a communications network, for example a "mobile" communications network via a wireless communications terminal (not shown), such as a mobile telephone, PDA, and/or any device with mobile telephone technology, in order to establish a digital connection, for example a digital connection via known Bluetooth technology. Thereafter, through its network service provider, the mobile terminal can establish a network connection (through the Internet for example) with the server 150. As such, a "mobile" network connection can be established between the navigation apparatus 200 (which can be, and often times is, mobile as it travels alone and/or in a vehicle) and the server 150 to provide a "real-time" or at least very "up to date" gateway for information.

In this example, the navigation apparatus 200 is a Bluetooth enabled navigation apparatus in order that the navigation apparatus 200 can be agnostic to the settings of the wireless communications terminal, thereby enabling the navigation apparatus 200 to operate correctly with the ever changing spectrum of mobile telephone models, manufacturers, etc. Model/manufacturer specific settings can, for example, be stored on the navigation apparatus 200, if desired. The data stored for this information can be updated.

Although not shown, instead of requiring the wireless communications terminal to provide access to the communications network, the navigation apparatus 200 can, of course, comprise mobile telephone technology, including an antenna, for example, or optionally using an internal antenna of the navigation apparatus 200. The mobile telephone technology within the navigation apparatus 200 can also include an insertable card (e.g. Subscriber Identity Module (SIM) card). As such, mobile telephone technology within the navigation apparatus 200 can similarly establish a network connection between the navigation apparatus 200 and the server 150, via the Internet for example, in a manner similar to that of any wireless communications-enabled terminal.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the internet connection can be utilised, which can be achieved via a data connection using the mobile telephone or mobile telephone technology.

The server 150 includes, in addition to other components which may not be illustrated, a processor 154 constituting a processing resource and operatively connected to a memory 156 and further operatively connected, via a wired or wireless connection 158, to a mass data storage device 160. The mass storage device 160 contains a store of navigation data and map information. Further details of such data are set out later below. The mass storage device 160 can again be a separate device from the server 150 or can be incorporated into the server 150. The processor 154 is further operatively connected to transmitter 162 and receiver 164, to transmit and receive information to and from navigation apparatus 200 via the communications channel 152. The signals sent and received may include data, communication, and/or other propagated signals. The transmitter 162 and receiver 164 may be selected or designed according to the communications requirement and communication technology used in the communication design for the navigation system. Further, it should be noted that the functions of transmitter 162 and receiver 164 may be combined into a single transceiver.

As mentioned above, the navigation apparatus 200 can be arranged to communicate with the server 150 through communications channel 152, using transmitter 166 and receiver 168 to send and receive data through the communications channel 152, noting that these devices can further be used to communicate with devices other than the server 150. Further, the transmitter 166 and receiver 168 are selected or designed according to communication requirements and communication technology used in the communication design for the navigation system and the functions of the transmitter 166 and receiver 168 may be combined into a single transceiver in a like manner to that described above in relation to the server apparatus 150. Of course, the navigation apparatus 200 comprises other hardware and/or functional parts, which will be described later herein in further detail.

Software stored in server memory 156 provides instructions for the processor 154 and allows the server 150 to provide services to the navigation apparatus 200 and/or perform other data processing tasks. For example, the server apparatus 150 can provide a service involving processing requests from the navigation apparatus 200 and transmitting navigation data from the mass data storage 160 to the navigation apparatus 200. Another service that can be provided by the server 150 includes processing the navigation data using various algorithms for a desired application and sending the results of these calculations to the navigation apparatus 200. Of course, the server apparatus 150 can support other functionality as will be described in further detail later below.

The server 150 can be used as a remote source of data accessible by the navigation apparatus 200 via, for example, a wireless channel. The server 150 may include a network server located on a local area network (LAN), wide area network (WAN), virtual private network (VPN), etc. A Personal Computer (PC) can be connected between the navigation apparatus 200 and the server 150 to establish an internet connection between the server 150 and the navigation apparatus 200.

The navigation apparatus 200 may be provided with information from the server 150 via information downloads which may be periodically updated automatically or upon a user connecting the navigation apparatus 200 to the server 150 and/or may be more dynamic upon a more constant or frequent connection being made between the server 150 and navigation apparatus 200 via a wireless mobile connection device.

Figure 3:
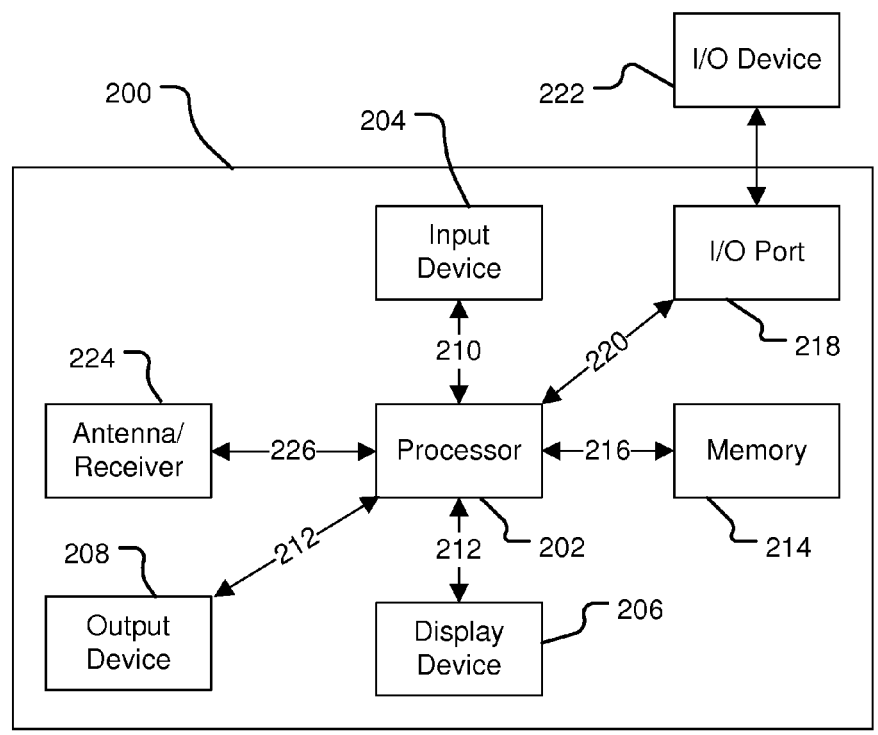
FIG. 3 is a schematic illustration of electronic components of the navigation apparatus of FIG. 2 or any other suitable navigation apparatus.

Referring to FIG. 3, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from input device 204 via a connection 210, and operatively connected to at least one of the display screen 206 and the output device 208, via respective output connections 212, to output information thereto. The navigation apparatus 200 may include an output device 208, for example an audible output device (e.g. a loudspeaker). As the output device 208 can produce audible information for a user of the navigation apparatus 200, it should equally be understood that input device 204 can include a microphone and software for receiving input voice commands as well. Further, the navigation apparatus 200 can also include any additional input device 204 and/or any additional output device, such as audio input/output devices for example. The processor 202 is operatively connected to memory 214 via connection 216 and is further adapted to receive/send information from/to input/output (I/O) ports 218 via connection 220, wherein the I/O port 218 is connectible to an I/O device 222 external to the navigation apparatus 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish the data connection between the navigation apparatus 200 and the server 150 via the Internet or any other network for example.

FIG. 3 further illustrates an operative connection between the processor 202 and an antenna/receiver 224 via a connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated.

For example, the components shown in FIG. 3 may be in communication with one another via wired and/or wireless connections and the like. Thus, the navigation apparatus 200 described herein can be a portable or handheld navigation apparatus 200.

Figure 4:
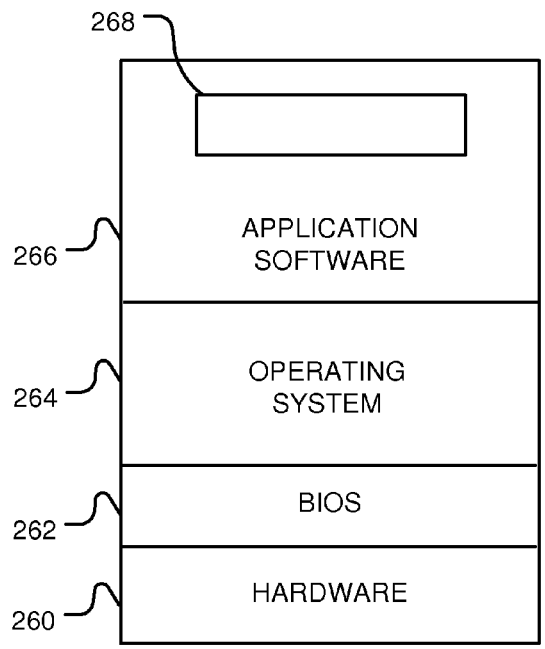
FIG. 4 is a schematic diagram of an arrangement of mounting and/or docking a navigation apparatus.

Turning to FIG. 4, the processor 154 and memory 156 of the server apparatus 150 cooperate to support a BIOS (Basic Input/Output System) 262 that functions as an interface between functional hardware components 260 of the server apparatus 150 and the software executed by the server. The processor 154 then loads an operating system 264 from the memory 156, which provides an environment in which application software 266 can run. The application software 266 provides an operational environment including a GUI that supports core functions of the server apparatus 150. Part of the application software 266 comprises an analysis module 268.

Figure 5:
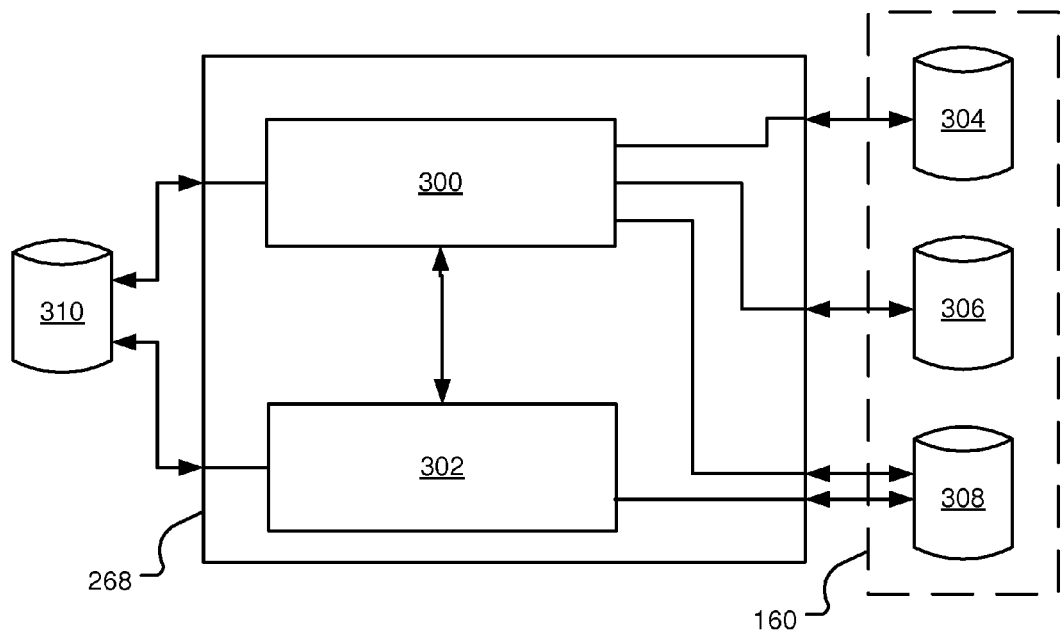
FIG. 5 is a schematic representation of an architectural stack employed by the navigation apparatus of FIG. 3.

Referring to FIG. 5, the analysis module 268 comprises a data pre-processor 300 capable of communicating with an inference engine 302. The data pre-processor 300 is operably coupled to a map data sharing database 304, a trip data database 306 and a POI database 308. The inference engine 302 is also operably coupled to the POI database 308. The map data sharing database 304 is a database of map-related information to which users of navigation apparatus can contribute information, for example road blocks, identities of new roads, and corrections of map features, and identities and locations of new points of interest. Additionally, the data pre-processor 300 and the inference engine 302 are operably coupled to a temporary data store 310.

Operation of the above server apparatus 150 will now be described in the context of trip data having been generated by a population of navigation apparatus and communicated to the server apparatus 150 or another computing resource in order to create and/or supplement the trip data database 306. In this respect, each of the navigation apparatus in the population, for example the navigation apparatus 200, is configured with an ability to collect trip information relating to a planned or unplanned itinerary of the navigation apparatus 200, including events that the navigation apparatus 200 can detect, for example changes in signal strength of one or more GPS signals received by the navigation apparatus 200. Recordal of the events can, if desired, be conditional upon a certain criterion being met, for example the signal strength falling below a given threshold. However, in this example, the signal strength data is recorded when other trip data is recorded or when GPS signals cannot be received and no other detailed local evaluation of the signal strength is made. The trip data is recorded in a log that is stored by a digital memory (not shown) of the navigation apparatus 200. The log is communicated to the server apparatus 150 when a communications session is next established between the navigation apparatus 200 and the server apparatus 150, for example using the TomTom HOME system whereby the navigation apparatus 200 is docked with the Personal Computer (PC) (mentioned above) and the communications session is established via an Internet connection to which the PC is coupled.

Data transfers can thus take place between the navigation apparatus 200 and the server 150.

In this example, the data transfer includes transferring the trip log, mentioned above and generated by the navigation apparatus 200, to the server apparatus 150, the content of the log file being stored in the trip data database 306. The trip data database 306 will thus comprise, inter alia, location data and temporal data, for example a timestamp or other indication in order to identify a point or period in time to which the location data stored relates, such as when a navigation apparatus was at a given location. If recorded, the trip data also comprises signal strength data to accompany the temporal data. In this example, the location data is recorded as longitude and latitude coordinates.

Figure 6:
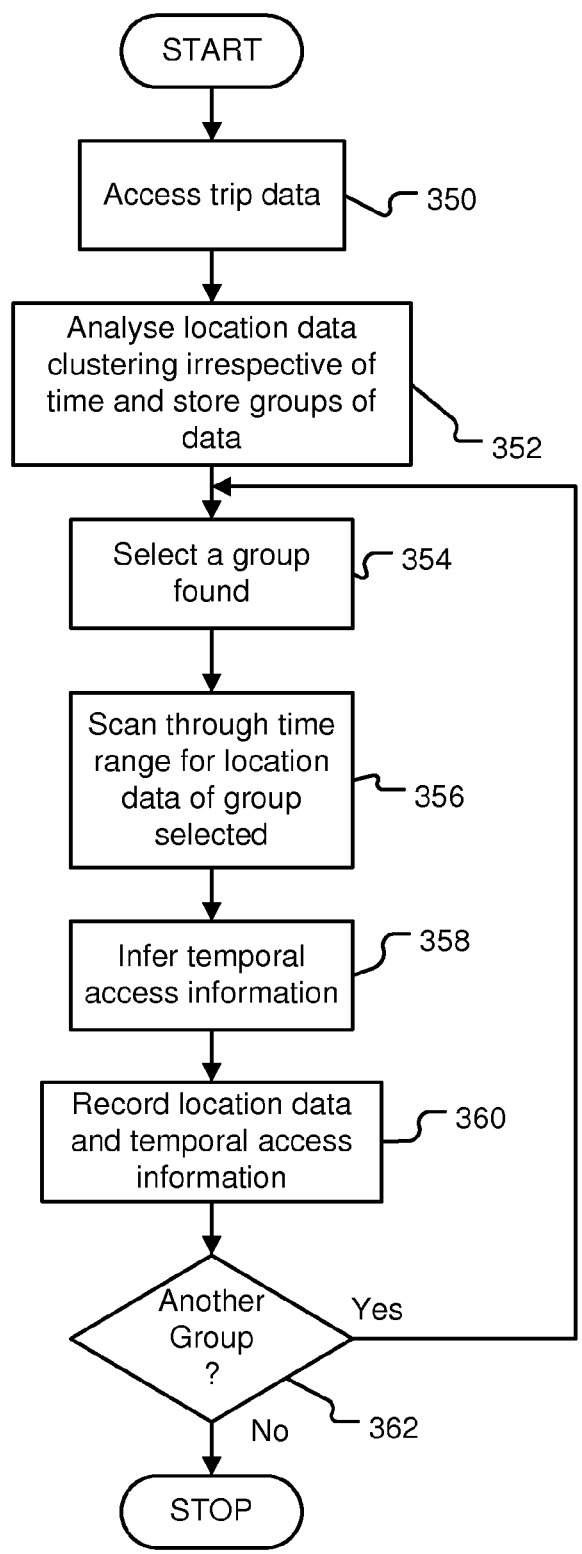
FIG. 6 is a schematic diagram of an analysis module of FIG. 5 in greater detail.

In operation (FIG. 6), the server apparatus 150 processes the trip data stored in the trip data database 306 as follows. The data pre-processor 300 accesses (Step 350) the trip data database 306 and analyses the location data and associated respective temporal data, for example a plurality of times respectively relating to a plurality of spatial locations. The data pre-processor 300 identifies (Step 352) spatial clusters of location data, i.e. the clusters of location data are identified irrespective of time, the identification of spatial clusters constituting a predetermined criterion. The clusters or groups of location information are formed from at least part of the location data stored in the trip data database 306. Once the groups have been identified, the clusters or groups of location data are then temporarily stored in the temporary data store 310 and the data pre-processor 300 then communicates with the inference engine 302 in order to indicate that the grouped location data is available for further processing. In this respect, the inference engine 302 then selects (Step 354) a group of location data and temporal data associated therewith from the groups of location data and temporal data temporarily stored, and scans (Step 356) through the group of the location data and associated temporal data selected in order generate a temporal access profile for the group of the location data and the associated temporal data selected. The scan is over the range of time covered by the temporal data. In this example, the temporal access profile identifies numbers of location data entries within a predetermined time interval, for example 5, 10 or 15 minutes, although other intervals can be employed to achieve different degrees of granularity. Once generated, the inference engine 302 analyses the temporal access profile data in order to infer (Step 358) temporal access information therefrom, for example times when physical access to a POI associated with the cluster of location data selected is possible, such as opening hours or hours of business. The temporal access information characterises accessibility of the point of interest, for example when access to the point of interest is permitted or is not permitted. The inference of the temporal access information can be achieved using any suitable pattern analysis techniques for analysing the temporal access profile, for example of which will be described later herein. The inferred temporal access information is then stored (Step 360) in the temporary data store 310 along with an identifier for subsequent processing, details of which will also be provided later herein. An example of the identifier is location data corresponding, in this example, substantially to a central location with respect to the group of location data selected. The inference engine 302 then determines (Step 362) whether the temporary data store 310 contains another group of location data having associated temporal data to be analysed. If the inference engine 302 determines that other groups of data in the temporary data store 310 remain to be analysed, the inference engine 302 repeats the above-mentioned processing steps (Steps 354 to 362) until no further groups of location data remain to be analysed.

Figure 7:
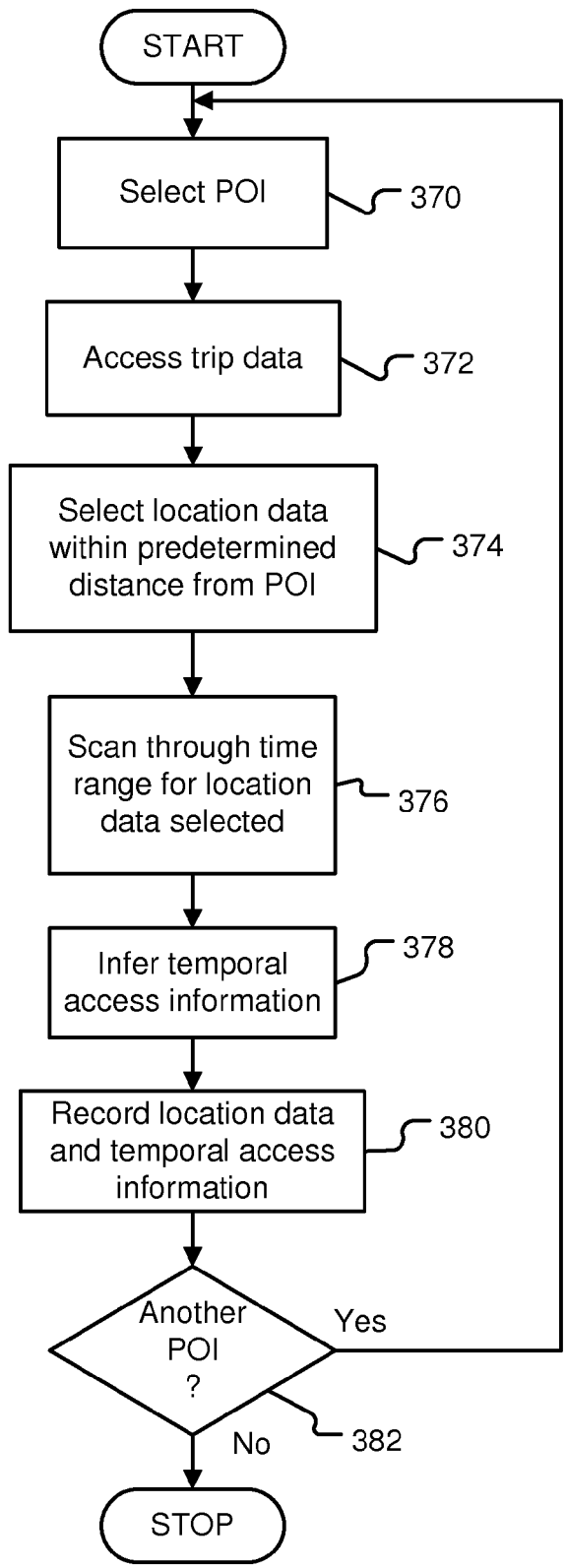
FIG. 7 is a flow diagram of a first method of determining temporal access information constituting a first embodiment of the invention.

The above technique generates temporal information in respect of any grouping of location data found in the trip data database 306. However, in another embodiment (FIG. 7), the processing can be restricted to only POIs that are known and identified in the POI database 308. For such processing, the data pre-processor 300 accesses the POI database 308 and selects (Step 370) a POI by obtaining an identifier, for example a name, and POI location data. The data pre-processor 300 then accesses (Step 372) the trip data database 306 and analyses the location data and associated respective temporal data, for example of the type described above in relation to the previous embodiment. The data pre-processor 300 identifies (Step 374) clusters of location data, the location data clustering about the location of the POI selected from the POI database 308, i.e. the clusters of location data are again identified irrespective of time. The proximity from the location of the POI can be set as a criterion for selecting location data and associated time data with respect to the POI selected, for example within a notional boundary such as a radius of a given distance, such as 3 m. The cluster or group of location data, formed from at least part of the location data stored in the trip data database 306, is then temporarily stored in the temporary data store 310 and the data pre-processor 300 then communicates with the inference engine 302 in order to indicate that the grouped location data is available for further processing. In this respect, the inference engine 302 then selects the group of location data and temporal data associated therewith stored and scans (Step 376) through the group of the location data and the associated temporal data in order to generate a temporal access profile for the group of the location data and the associated temporal data selected. The scan is over the range of time covered by the temporal data. In this example, the temporal access profile identifies numbers of location data entries within a predetermined time interval, for example 5, 10 or 15 minutes, although other intervals can be employed. Once generated, the inference engine 302 analyses the temporal access profile in order to infer (Step 378) temporal access information therefrom, for example times when physical access to a POI associated with the cluster of location data selected is possible, such as opening hours or hours of business. The temporal access information characterises accessibility of the point of interest, for example when access to the point of interest is permitted or is not permitted. The inference of the temporal access information can be achieved using any suitable pattern analysis techniques for analysing the temporal access profile, an example of which will be described later herein. The inferred temporal access information is then used to update the data entry in the POI database 308 corresponding to the POI selected. The inference engine 302 then determines (Step 362) whether the POI database 308 contains any other POIs for which the inference engine 302 is to try to determine temporal access information. If the inference engine 302 determines that other POIs in the POI database 308 remain to be analysed, the inference engine 302 repeats the above-mentioned processing steps (Steps 370 to 382) until no further POIs remain to be analysed.

It should be appreciated that the above-described technique can additionally or alternatively be implemented in respect of POI data stored in the map data sharing database 304.

Figure 8:
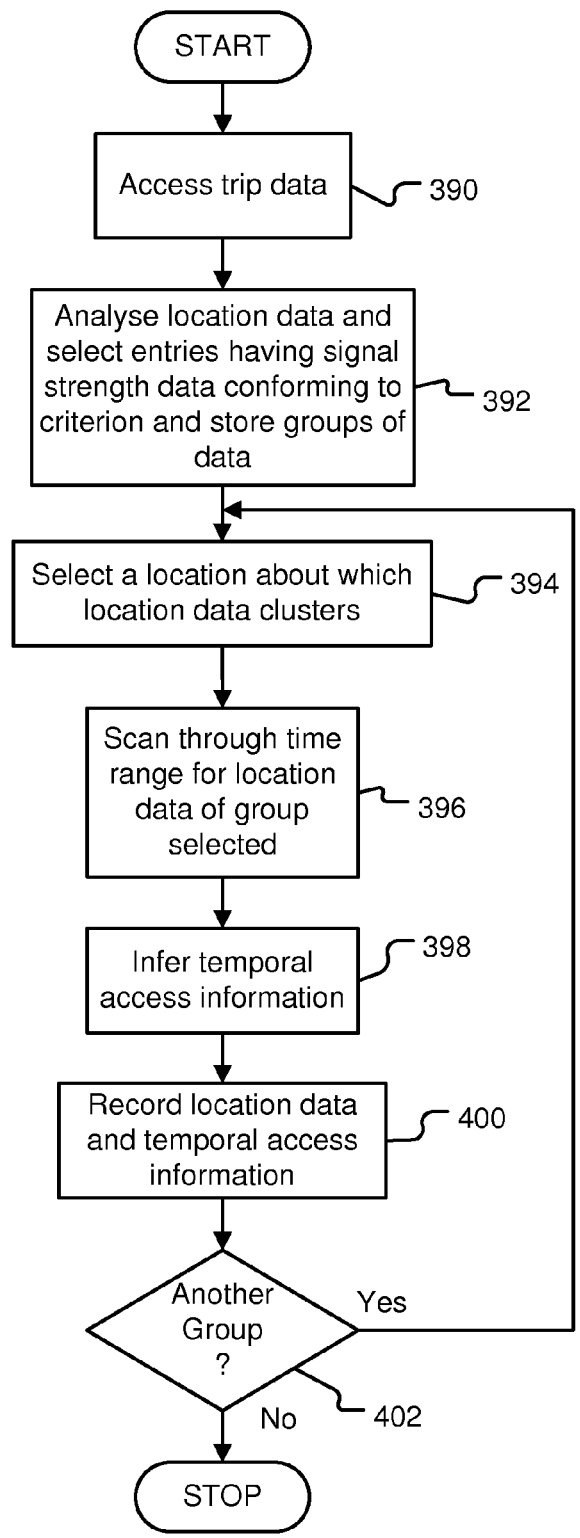
FIG. 8 is a flow diagram of a second method of determining temporal access information constituting a second embodiment of the invention.

In order to provide greater integrity in relation to the inference of the temporal information, a different approach can be employed. In a further embodiment (FIG. 8), instead of analysing clusters or groupings in space, the analysis module 268 analyses the trip data of the trip data database 306 as follows.

The data pre-processor 300 accesses (Step 390) the trip data database 306 and analyses the location data and associated respective temporal data, for example of the type mentioned above in relation to the previous embodiments. The data pre-processor 300 identifies (Step 392) location data having not only temporal data associated therewith but also signal strength information associated therewith, the signal strength information conforming to a predetermined criterion. The signal strength information would therefore have to be recorded in the manner described above. In this example, the predetermined criterion is a predetermined signal strength threshold. Recordal of a drop in receive signal strength below the predetermined signal strength threshold is indicative of a navigation apparatus being located in a building or other structure, for example a tunnel or ferry, where GPS signals are attenuated, possibly to a level of being completely unreceivable. Indeed, the predetermined criterion need not specify a threshold and the predetermined criterion can be total loss of receipt of the GPS signals.

Once the location data has been filtered, at least part of the location data remains and the data pre-processor 300 then identifies clusters of location data within the filtered location data, i.e. the clusters of location data are identified irrespective of time. The clusters or groups of location data having temporal and signal strength data associated therewith are then temporarily stored in the temporary data store 310 and the data pre-processor 300 communicates with the inference engine 302 in order to indicate that the grouped location data is available for further processing. In this respect, the inference engine 302 then selects (Step 394) a group of the location data and the temporal information associated therewith selected from the groups of the location data temporarily stored, and scans (Step 396) through the location data and the associated temporal data selected in order generate a temporal access profile for the group of the location data and the associated temporal data selected. The scan is over the range of time covered by the temporal data. In this example, the temporal access profile identifies numbers of location data entries within a predetermined time interval, for example 5, 10 or 15 minutes, although other intervals can be employed. Once generated, the inference engine 302 analyses the temporal access profile in order to infer (Step 398) temporal access information therefrom, for example times when physical access to a POI associated with the cluster of location data selected is possible, such as opening hours or hours of business. The inference of the temporal access information can be achieved using any suitable pattern analysis techniques for analysing the temporal access profile, an example of which will be described later herein. The inferred temporal access information is then stored (Step 400) in the temporary data store 310 along with an identifier for subsequent processing, details of which will also be provided later herein. An example of the identifier is location data corresponding, in this example, substantially to a central location with respect to the group of location data selected. The inference engine 302 then determines (Step 402) whether the temporary data store 310 contains another group of location data having associated temporal data and signal strength data to be analysed. If the inference engine 302 determines that other groups of data in the temporary data store 310 remain to be analysed, the inference engine 302 repeats the above-mentioned processing steps (Steps 394 to 402) until no further groups of location data remain to be analysed.

Whilst the above example has been described in the context of filtering the location data according to the predetermined criterion relating to signal strength, the skilled person should appreciate that the above-mentioned filtering can be employed after filtering the location data first according to another criterion, for example of the type described above in relation to the first and second embodiments, i.e. after identifying clusters.

Additionally or alternatively, if the navigation apparatus used to generate the trip data are capable of recording signal strength in relation to a wireless communications apparatus, for example a bidirectional wireless communications apparatus, such as a wireless cellular telephone or communications module, the signal strength of signals received by the wireless communications apparatus can be used in a like manner to the signal strength of the received GPS signals described above.

Figure 9:
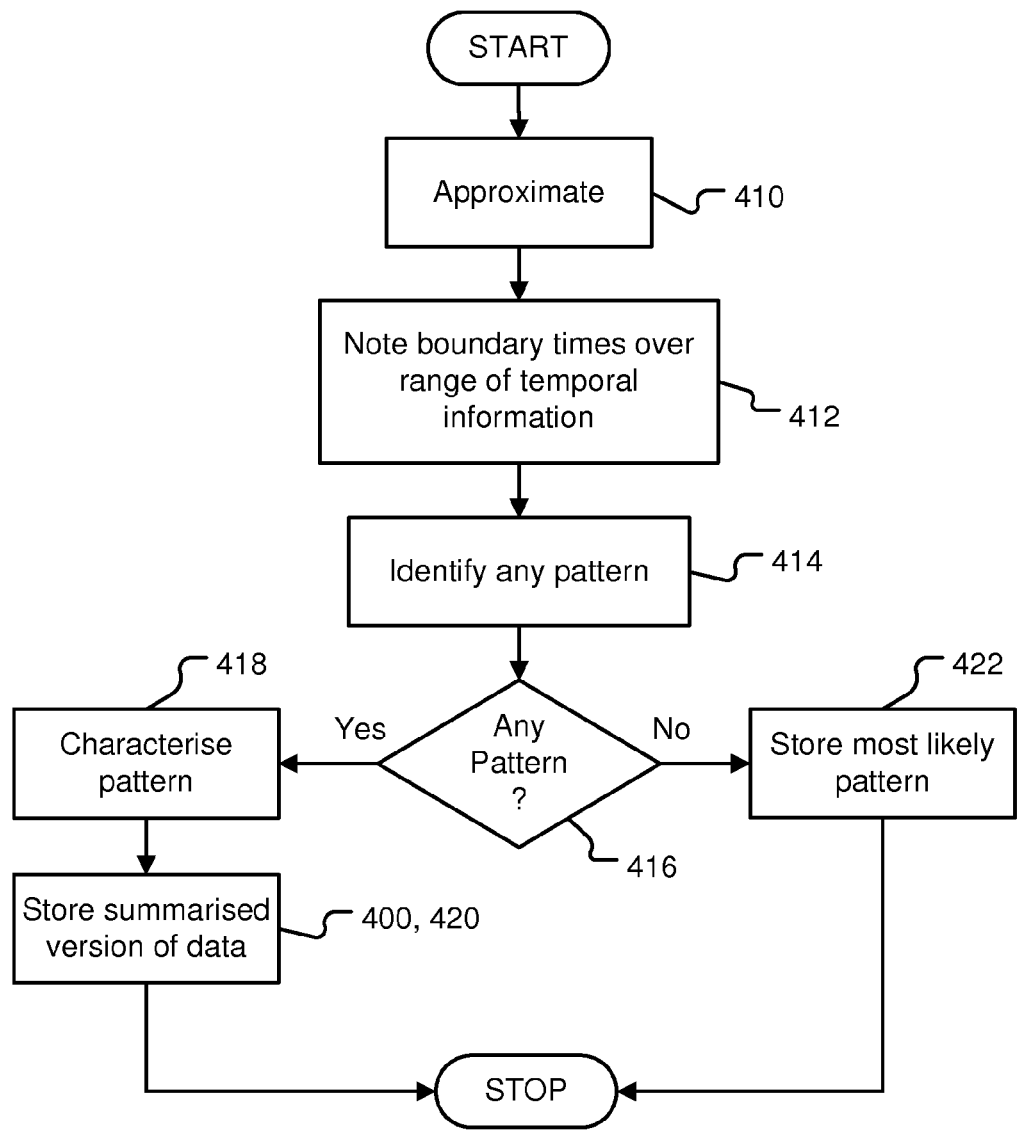
FIG. 9 is a flow diagram of a third method of determining temporal access information constituting a third embodiment of the invention.

Referring to FIG. 9, the exemplary inference technique employed by the inference engine 302 is described in more detail. As mentioned above, the inference engine 302 builds the temporal access profile and then infers temporal access information from the temporal access profile. Over the period of time that the temporal data spans, the inference engine 302 firstly approximates (Step 410) the times recorded by a predetermined amount, for example a nearest 15 minutes. Of course, the skilled person will appreciate that other levels of approximation can be employed. Thereafter, the inference engine 302 notes (Step 412) boundary times when groupings of location data occur and when groupings of location data do not occur, the period in-between commencement in time of a grouping of location data and cessation in time of the grouping of the location data being assumed to constitute a period of time when a POI, corresponding to the location data, is accessible. In respect of the period of time that the location data spans, the inference engine 302 tries to identify (Step 414) any repeating patterns to the boundary times identified, for example a daily pattern, a weekly pattern, a monthly pattern, a yearly pattern and/or a seasonal pattern. It should be appreciated that multiple patterns can exist in relation to the POI. For example, a shop can be open from 9.00 am to 5.00 pm from Monday to Friday throughout a year, but can have different opening hours in respect of every first Monday of a month. In the event that a pattern to the temporal information exists (Step 416), the inference engine 302 characterises (Step 418) the temporal information according to the pattern identified and then stores (Step 400, 420) the characterised temporal information in the temporary data store 310 along with the identifier mentioned previously for subsequent processing. In the event that a pattern is not evident (Step 416), a sample of the boundary times for a predetermined period of time, for example a week, can be temporarily stored (Step 400, 422) in the temporary data store 310 as representative of the temporal access information relating to accessibility of the point of interest along with the identifier mentioned previously for subsequent processing. If desired, the information stored can be flagged as not having a reliable pattern associated therewith.

Figure 10:
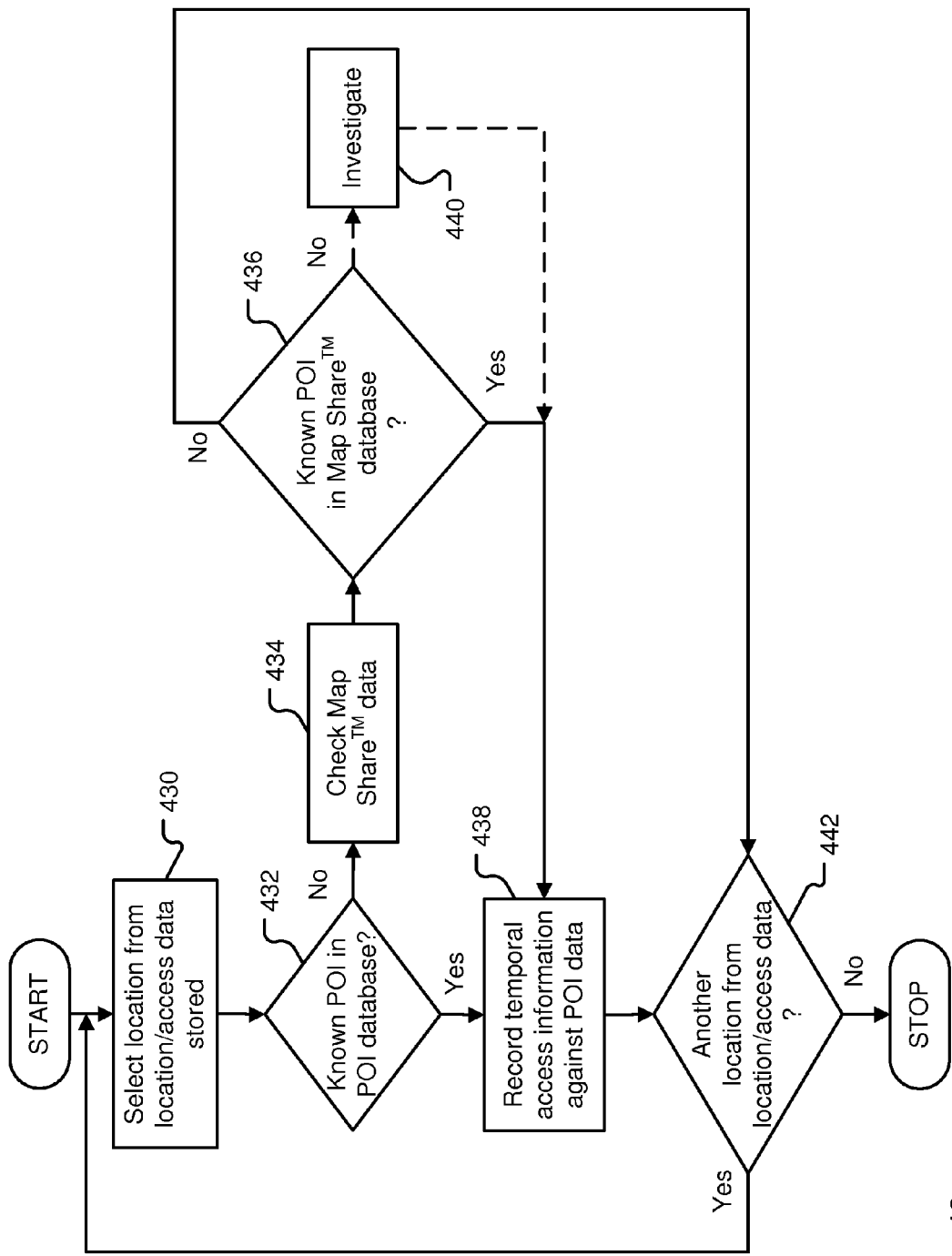
FIG. 10 is a flow diagram of a method of inferentially processing temporal data fo use with the methods of FIG. 7 or 9.

As mentioned above, in respect of some of the embodiments described above, POIs are unidentified and so it is necessary to attribute a POI identity to the temporal information generated. Turning to FIG. 10, the identifier and temporal access information stored in the temporary data store 310 can be retrieved in turn in relation to each identifier stored and processed as follows.

The inference engine 302 selects (Step 430) the identifier along with the temporal access information stored in the temporary data store 310. The inference engine 302 then accesses the POI database 308 and analyses the POI data contained therein in order to determine (Step 432) whether the identifier, in this example a location, selected is identical or close to a location of a POI in the POI database 308, the proximity being set by a predetermined proximity threshold, for example 1m. Hence, the POI database 308 is searched in order to find a POI that is substantially co-located with the location associated with the identifier selected. If a match does not exist, the inference engine 302 analyses (Step 434) the map data sharing database 304 in a like manner to that described above in relation to the POI database 308 in order to try to identify (Step 436) a POI corresponding to the identifier/location selected. In the event that the identity of the location selected is found in either of the POI database 308 or the map data sharing database 304, the POI database 308 or the map data sharing database 304 is updated (Step 438) with the temporal access information inferred, depending upon the database from which the POI was identified.

In the event that the location can not be identified from the POI database 308 or the map data sharing database 304, the inference engine 302 can choose either to wait for a subsequent execution of the POI identification process described above or generate an alert to request manual investigation (Step 440) and the results of the investigation can then be provided through a separate input process to the inference engine 302 in order to store (Step 438) the temporal access information in relation to the POI identified in the POI database 308.

Following update (Step 438) of the POI database 308 or the map data sharing database 304 or in circumstances where a POI can not be identified from the location selected, the inference engine 302 determines (Step 442) whether the temporary data store 310 contains further location data and associated temporal access information to be processed. If further data exists for processing, the above POI identification process is repeated (Steps 430 to 442) until no further locations need to be identified.

Figure 11:
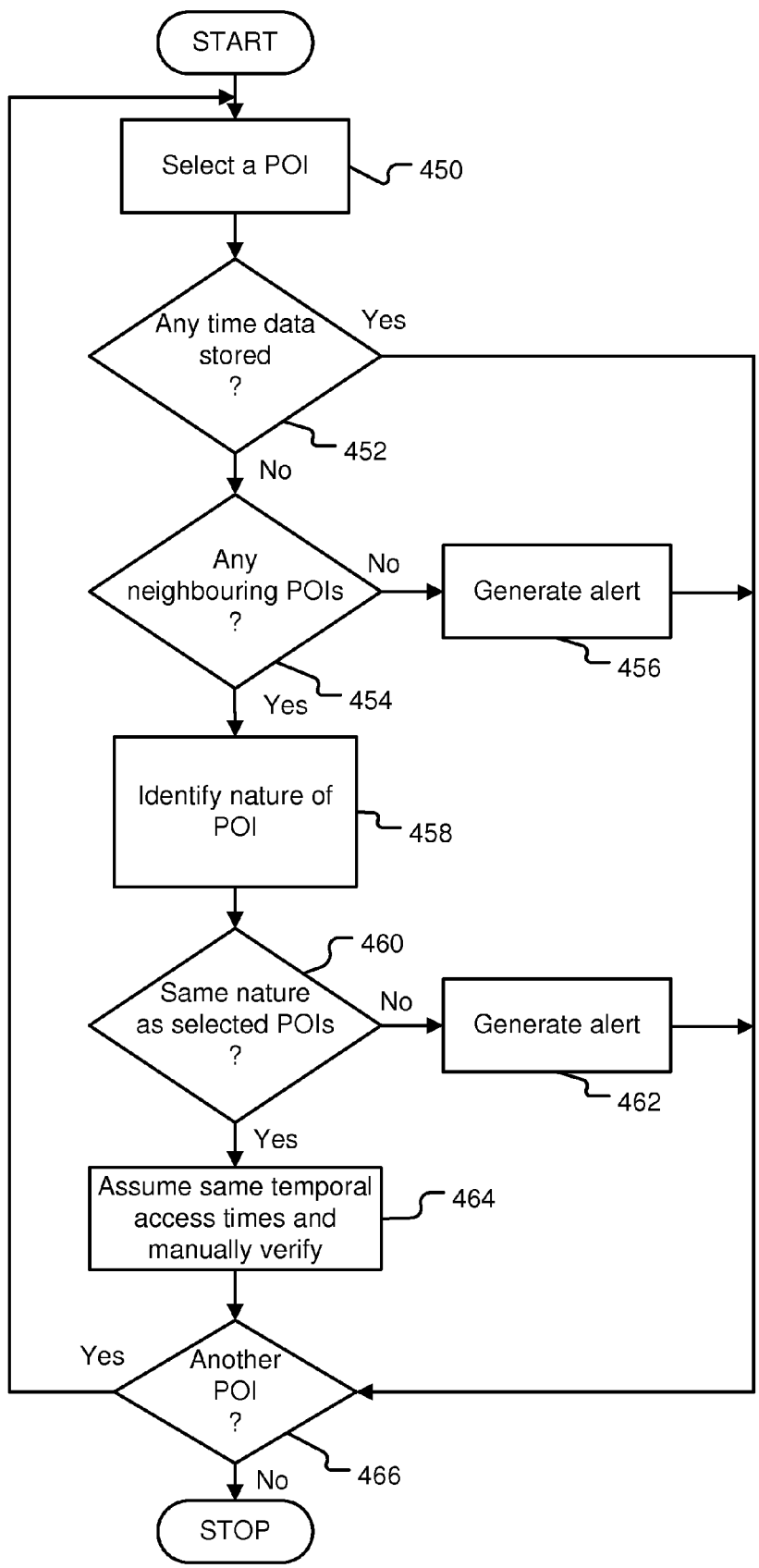
FIG. 11 is a flow diagram of a method of identifying a POI for temporal access information generated by the method of FIG. 7, 8 or 9.

In some circumstances, temporal information may not be available in relation to a POI in the POI database 308, but the POI database 308 contains temporal access information in respect of other, nearby, POIs. Referring to FIG. 11, in order to complete omissions of temporal access information in the POI database 308, the inference engine 302 selects a POI from the POI database (Step 450) and determines (Step 452) whether the POI database 308 contains temporal access information in respect of the POI selected. In the event that temporal access information exists for the POI selected, the inference engine 302 proceeds to examine other POI entries in the POI database 308 as will be described later herein. However, in the event that the inference engine 302 determines (Step 452) that the POI selected lacks temporal access information, the inference engine 302, using location data associated with the POI selected, searches the POI database 308 and the map data sharing database 304 in order to determine (Step 454) whether either of these databases 304, 308 contain entries relating to POIs that neighbour the POI selected. In this respect, neighbouring is pre-defined as a predetermined distance from the POI selected, for example 300m. In the event that no neighbouring POIs are identified, the inference engine 302 generates (Step 456) an alert indicative of a need for manual investigation of the temporal access information associated with the POI selected. Alternatively, if neighbouring POIs are found, the inference engine 302 identifies (Step 458) a nature of the POI selected, for example from category information associated with the POI selected and stored in the POI database 308, and then determines (Step 460) if any of the neighbouring POIs have the same nature as the POI selected. In this example, the inference engine 302 looks for POI categories in common. If none of the POIs found share the same nature as the POI selected, the inference engine 302 generates (Step 462) an alert indicative of a need for manual investigation of the temporal access information associated with the POI selected. Otherwise, the inference engine 302 then determines the most common temporal access information from amongst the POIs found having the same nature as the POI selected and assumes (Step 464) that the most common temporal access information applies equally to the POI selected. The inference engine 302 then determines (Step 466) whether all POIs in the POI database 308 have been processed and, if not, the above processing steps (Steps 450 to 466) are repeated until no further POI entries in the POI database 308 remain to be processed.

It should be appreciated that the above embodiment can additionally or alternatively be applied to the map data sharing database 304.

In a further embodiment, a number of predetermined temporal access profiles can be created to represent typical temporal access profiles relating the POIs. One of the predetermined temporal access profiles can be selected and stored against a POI in the POI database 308 or the map data sharing database 304 in order to record the temporal access information in an efficient manner. If desired, record of the temporal access information can be implemented by specifying one of the predetermined temporal access profiles and a relative indicator, or variation, for example: temporal-access-profile1+1 hour (temporal-access-profile1 defining, in this example, opening hours of 9:00 am to 5:00 pm, Monday to Saturday).

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments specify certain distances in relation to predetermined proximity or vicinity, the skilled person should appreciate that such values can be varied to modify a level of accuracy achieved.

It should also be appreciated that reference herein to a POI is intended to embrace any predefined waypoint and is not limited to certain well-known types of POI, for example shops, restaurants and museums. Indeed, the POI can be embodied by other types of cartographic features, for example: a tunnel, ferry port or railway station.

Whilst embodiments described in the foregoing detailed description refer to GPS, it should be noted that the navigation apparatus may utilise any kind of position sensing technology as an alternative to (or indeed in addition to) GPS. For example the navigation apparatus may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A data enrichment apparatus enabling generation of richer point of interest content, comprising:
a processing resource arranged to access, when in use, location data having temporal data associated therewith, and to group a part of the location data according to a predetermined criterion; wherein
the processing resource is arranged to support an analysis module capable of inferring temporal access information from the part of the location data grouped, the temporal access information being indicative of at least one of opening hours and hours of business of a point of interest associated with the part of the location data grouped, wherein the analysis module is arranged to analyze the temporal data associated with the part of the location data grouped and to identify boundary times from the temporal data associated with the part of the location data.

2. An apparatus as claimed in claim 1, further comprising location trip data comprising the location data and the temporal data associated therewith.

3. An apparatus as claimed in claim 1, wherein the temporal data comprises a time associated with a navigation apparatus being at a location.

4. An apparatus as claimed in claim 1, wherein the predetermined criterion is spatial clustering.

5. An apparatus as claimed in claim 4, wherein the spatial clustering is within a predetermined notional boundary.

6. An apparatus as claimed in claim 1, wherein the predetermined criterion is a predetermined proximity to the point of interest.

7. An apparatus as claimed in claim 1, wherein the analysis module is arranged to analyse the temporal data associated with the part of the location data grouped and build a temporal access profile associated with the part of the location data grouped.

8. An apparatus as claimed in claim 1, wherein the boundary times are used to determine the temporal access information associated with the point of interest.

9. An apparatus as claimed in claim 1, wherein the analysis module is arranged to match a closest predetermined temporal access profile to the temporal access information inferred.

10. An apparatus as claimed in claim 9, wherein the closest predetermined temporal access profile is a predetermined characterisation of physical accessibility to the point of interest with respect to time.

11. An apparatus as claimed in claim 9, wherein the analysis module is capable of recording the match by a variation with respect to the closest predetermined temporal access profile.

12. An apparatus as claimed in claim 1, wherein the point of interest is unidentified.

13. An apparatus as claimed in claim 12, wherein the analysis module is arranged to access a point of interest database comprising identities of points of interest and respective location data, and to identify the unidentified point of interest using the point of interest database.

14. An apparatus as claimed in claim 13, wherein the point of interest database is formed by contribution of point of interest information from users of navigation apparatus.

15. An apparatus as claimed in claim 14, wherein the radio-frequency signal relates to a navigation system or a wireless bidirectional communications system.

16. An apparatus as claimed in claim 14, wherein the analysis module is arranged to group the part of the locations data also according to another predetermined criterion, the another predetermined criterion being one of spatial clustering or a predetermined proximity to the point of interest.

17. An apparatus as claimed in claim 1, wherein the predetermined criterion is change in strength of a radio-frequency signal being received.

18. An apparatus as claimed in claim 17, wherein the change in strength is relative to a predetermined threshold value or loss of reception of the radio-frequency signal.

19. An apparatus as claimed in claim 1, wherein the analysis module is arranged to infer in respect of the part of the location information grouped a same temporal access information as another temporal access information associated with a neighbouring point of interest relative to the point of interest.

20. A location data processing system comprising:
the data enrichment apparatus as claimed in claim 1;
a database of the location data having the temporal data associated therewith; and
a plurality of navigation apparatus arranged to contribute to the database of the location data.

21. A method of determining temporal access information associated with a point of interest, enabling generation of richer point of interest content, the method comprising:
accessing location data having temporal data associated therewith;
grouping a part of the location data according to a predetermined criterion;
inferring temporal access information from the part of the location data grouped, the temporal access information being indicative of at least one of opening hours and hours of business of a point of interest associated with the part of the location data grouped;
analysing the temporal data associated with the part of the location data grouped; and
identifying boundary times from the temporal data associated with the part of the location data grouped.

22. A computer program element embodied on a non-transitory computer readable medium comprising computer program code means to make a computer execute a method of determining temporal access information associated with a point of interest, enabling generation of richer point of interest content, the method comprising:
accessing location data having temporal data associated therewith;
grouping a part of the location data according to a predetermined criterion;

inferring temporal access information from the part of the location data grouped, the temporal access information being indicative of at least one of opening hours and hours of business of a point of interest associated with the part of the location data grouped;

analysing the temporal data associated with the part of the location data grouped; and identifying boundary times from the temporal data associated with the part of the location data grouped.

* * * * *